United States Patent Office 3,058,876
Patented Oct. 16, 1962

3,058,876
INSECTICIDAL ORGANIC PHOSPHORUS COMPOUNDS
Gail H. Birum, Dayton, Ohio, assignor to Monsanto Chemical Company, St. Louis, Mo., a corporation of Delaware
No Drawing. Filed Apr. 11, 1960, Ser. No. 21,132
20 Claims. (Cl. 167—22)

The present invention relates to sulfur-containing organic compounds of phosphorus. It is an object of this invention to provide new and useful sulfur-containing organic compounds of phosphorus. It is another object of this invention to provide methods for preparing new sulfur-containing organic compounds of phosphorus. It is yet another object of this invention to provide new insecticidal compositions. It is still another object of this invention to provide methods for destroying insect pests.

Other objects and advantages of this invention will be apparent from a consideration of the accompanying disclosure and the appended claims.

In accordance with this invention there are provided, as new compounds, sulfur-containing organic compounds of phosphorus having the structure

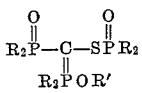

wherein R is selected from the group consisting of hydrocarbyl, hydrocarbyloxy, and halohydrocarbyloxy radicals having from 1 to 6 carbon atoms, and R' is selected from the group consisting of aliphatic and halogen-substituted aliphatic radicals having from 1 to 6 carbon atoms.

Further, in accordance with this invention, compounds having the above general formula are prepared by reacting an ester of a trivalent phosphorus acid having at least one aliphatic or halogen-substituted aliphatic radical of from 1 to 6 carbon atoms which is bonded through oxygen to the phosphorus atom with a member of the group consisting of thiophosgene and a trichloromethyl organic sulfur compound of the formula $Cl_3CSXR''$ wherein X is oxygen or sulfur and R'' is an organic radical having a molecular weight of up to 300 and is joined to the X atom through a carbon atom of the R' radical.

Further, in accordance with this invention, there are provided, new insecticide compositions containing as an essential active ingredient a compound having a general formula of the above type.

Further, in accordance with this invention, there is provided a method for destroying insect pests by exposing said insect pests to a toxic quantity of the above described sulfur-containing organic compounds of phosphorus.

The compounds of this invention have the characteristic structure

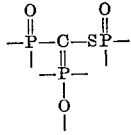

which contains a phosphorus to carbon double bond and three phosphorus atoms, each differing from the other two with respect to its substituents. The nature of the radicals that satisfy the indicated free valences depends upon the type of trivalent phosphorus ester that is used as the starting material. For example, when a phosphite ester, say, triethyl phosphite is used, the product obtained has the structure (A)
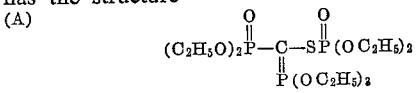

When a phosphonite ester is used, say, e.g., bis(2-chloropropyl) phenylphosphonite, the product has the structure (B)
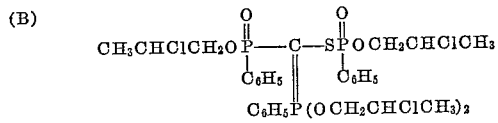

When a phosphinite ester, say, e.g., methyl diethylphosphinite, is used as the starting material the product has the structure (C)
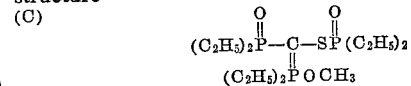

These compounds may be named as derivatives of phosphoranoic, phosphoranedioic, and phosphoranetrioic acids. Thus, compound (A) above is triethyl [(diethoxyphosphinyl) (diethoxyphosphinylthio) methylene] phosphoranetrioate. Compound (B) is bis(2-chloropropyl) {[(2 - chloropropoxy)phenylphosphinyl][(2 - chloropropoxy) phenylphosphinylthio] methylene}phenylphosphoranedioate, and compound (C) is methyl[(diethylphosphinyl) (diethylphosphinylthio) methylene]diethylphosphoraneoate.

The compounds of this invention, described above, are prepared by reacting an ester of a trivalent phosphorus acid having at least one radical selected from the group consisting of aliphatic and halogen-substituted aliphatic radicals having from 1 to 6 carbon atoms which is bonded through an oxygen atom to the phosphorus atom with a chlorine-containing organo sulfur compound selected from the group consisting of thiophosgene and a trichloromethyl sulfur compound of the formula $$Cl_3CSXR''$$

in which X is oxygen or sulfur and R'' is an organic radical having a molecular weight of up to 300 and is joined to the X atom through a carbon atom thereof. When thiophosgene is the chlorine-containing organic sulfur reactant, the reaction proceeds according to Equation 1.

(1)
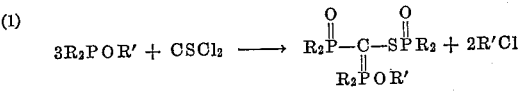

where R and R' are as defined above. When an ester of a trivalent phosphorus acid is reacted with a trichloromethyl sulfur compound of the formula given above, the reaction takes place with formation of the compound of this invention and two by-products according to Equation 2.

(2)
$4R_2POR' + Cl_3CSXR'' \longrightarrow$
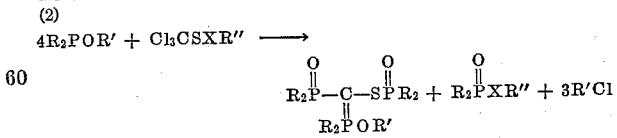

wherein R, R', R'', and X are as defined above. As will be seen from the above equation, the nature of the organic radical R'' in the trichloromethyl disulfide or sulfenate is immaterial insofar as the product

is concerned because the radical appears only in the phosphorus ester by-product. While the nature of R" is not important, for ease of reaction, however, it is preferred to employ a trichloromethyl disulfide or sulfenate in which the radical R" has a molecular weight of less than, say, 300.

The esters of trivalent phosphorus acids useful for the purpose of preparing the compounds of this invention are phosphite, phosphonite, and phosphinite esters having at least one aliphatic or halogen-substituted aliphatic radical having from 1 to 6 carbon atoms which is bonded through oxygen to the phosphorus atom. The remaining valences of the phosphorus ester starting material may be satisfied by hydrocarbyl, hydrocarbyloxy or halohydrocarbyloxy groups having from 1 to 6 carbon atoms. Phosphite esters are preferred for reasons of economy and ready availability. However, phosphonite and phosphinite esters may also be used.

Alkyl or haloalkyl phosphites useful for the preparation of the present compounds are the simple or mixed trialkyl phosphites such as trimethyl, triethyl, tri-n-propyl, triisopropyl, tri-n-butyl, triisobutyl, tri-n-amyl, triisoamyl, trihexyl, tricylohexyl, dimethyl ethyl, di-n-propyl methyl, amyl diethyl, ethyl methyl propyl, diethyl cyclohexyl 4-chlorocyclohexyl diethyl, and ethyl hexyl methyl phosphites; the simple or mixed haloalkyl phosphites such as tris(2-chloroethyl), tris(4-bromobutyl), tris(2,2,2-trichloroethyl), tris(3-iodopropyl), tris(2-fluoroethyl), tris(2,3,3-trichloropropyl), tris(3-bromohexyl) and tris(2-bromo-3-chloropropyl) phosphites; and phosphites in which both alkyl and haloalkyl radicals are present such as diethyl 2-chloropropyl phosphite or bis-(4-chlorobutyl) propyl phosphite.

Examples of phosphite esters containing aromatic radicals therein that may be used in this invention are compounds such as methyl diphenyl phosphite, diethyl phenyl phosphite, isopropyl 2-chloropropyl phenyl phosphite, n-butyl 4-bromoamyl 4-chlorophenyl phosphite, bis(2-chloroethyl) phenyl phosphite, bis(4-iodohexyl) 2-chlorophenyl phosphite, and 3-fluorobutyl bis(2-chlorophenyl) phosphite.

Other useful phosphite esters that may be used are, e.g., those having olefinic unsaturation therein, that is, phosphites containing alkenyl, alkadienyl, and/or cycloalkenyl radicals having from 1 to 6 carbons therein. Examples of such compounds are: triallyl, tris(3-pentenyl), diallyl methyl, bis(2-butenyl) ethyl, bis(3-hexenyl) propyl, bis(2-chloro-3-pentenyl) propyl, diethyl 2-butenyl, bis(2,4-butadienyl) propyl, diethyl 3-cyclohexenyl, and diallyl 3-chlorohexyl phosphites.

Phosphite esters having acetylenic unsaturation in the ester radicals may also be used. Examples of such compounds are tris(2-butynyl), diethyl 2-butynyl, tris(3-hexynyl), bis(2-chloropropyl) 3-pentynyl, bis(4-hexynyl) 2-bromopropyl, and propyl 2-propynyl 2-chloropropyl phosphites.

Phosphonite esters having at least one aliphatic or halogen-substituted aliphatic radical bonded through oxygen to the phosphorus atom will also react with the chlorine-containing organic sulfur compounds described above to provide compounds of the invention. Examples of phosphonite esters that may be used are the simple or mixed alkyl phosphonites, e.g., dimethyl methyl-, diethyl ethyl-, di-n-propyl propyl-, and ethyl hexyl butylphosphonites; the haloalkyl phosphonites, such as bis(2-chloroethyl) ethyl-, bis(4-bromohexyl) hexyl-, ethyl 2-iodopropyl ethyl-, and bis(2-bromoethyl) amylphosphonites; the cycloalkyl phosphonites such as ethyl cyclohexyl ethyl-, dicyclopentyl propyl-, and bis(2-chloropropyl) cyclohexylphosphonites. Phosphonite esters containing olefinic unsaturation in the hydrocarbyl groups may also be used; e.g., bis(2-butenyl)(2-butenyl)-, diallyl ethyl-, diallyl allyl-, dimethyl 4-hexenyl-, propyl 2-butenyl propyl-, diethyl 1,3-butadienyl-, and bis(2-chloroethyl) 3-cyclohexenylphosphonites. Examples of phosphonite esters containing acetylenic unsaturation which may be used are: bis(3-pentynyl) ethyl-, dipropyl 2-butenyl-, bis(2-bromo-4-hexynyl) methyl-, propyl 2-propynyl propyl-, and 3-pentynyl allyl ethylphosphonites. Phosphonite esters containing aromatic radicals may also be used; e.g., ethyl phenyl phenyl-, allyl phenyl phenyl-, 2-chlorophenyl propyl ethyl-, 2-chloroethyl phenyl cyclohexyl-, and bis(2-chloropropyl) phenylphosphonites.

Although less commonly available at the present time, phosphinite esters may also be used to prepare compounds of the present invention by reaction with the chlorine-containing organic sulfur compounds described above. Such phosphinite esters useful in this invention are those having organic radicals the same as those described above in more detail for the phosphite and phosphonite esters. However, for purposes of illustration, a few examples of phosphinite esters useful in this invention are methyl dimethyl-, allyl diethyl-, 2-chloroethyl diphenyl-, propyl hexylphenyl-, 2-chloropropyl dibutyl-, amyl bis(3-pentynyl)-, and 2-propynyl diphenylphosphinites.

Examples of the presently useful trichloromethyl disulfides or sulfenates are the alkyl or aryl compounds having from 1 to 18 carbon atoms in the alkyl or aryl radical such as methyl, ethyl, propyl, butyl, amyl, hexyl, octyl, decyl, dodecyl, hexadecyl, octadecyl, phenyl or naphthyl trichloromethyl sulfenates or disulfides; the alkaryl compounds such as 2-, 3-, or 4-ethyl, butyl, dodecyl or octadecylphenyl trichloromethyl disulfides or sulfenates; the aralkyl compounds such as benzyl, 2-phenylethyl, 3-phenylpropyl, 2-(4-tolyl)-ethyl or 2-α-naphthylethyl trichloromethyl disulfides or sulfenates compounds having in the alkyl, aryl, alkaryl and aralkyl radicals substituents such as the chloro, nitro, amino, cyano, alkoxy, mercapto, and hydroxyalkyl radicals, e.g., 5-bromoamyl, 3-cyanopropyl, 2-, 3-, or 4-chlorophenyl, 2,3-dichlorophenyl, 2-, 3-, or 4-nitrophenyl, 2,4-dinitrophenyl, 2-chloro-4-nitrophenyl, 4-bromo-4'-xenyl, 3-hydroxypropyl, 2-aminoethyl, 2-chloroethyl, 2-nitropropyl, 4-phenoxyphenyl, pentachlorophenyl, β-ethoxynaphthyl, or 2-chloro-4-ethoxybenzyl trichloromethyl disulfidese or sulfenates.

Another class of presently useful disulfides or sulfenates includes the trichloromethyl alkenyl compounds such as the propenyl, or n-undecenyl disulfides or sulfenates. The alkenyl radical may be substituted by radicals such as the nitro, chloro, cyano, amino, alkoxy, or hydroxyalkyl radicals.

Still another class of the presently useful disulfides or sulfenates includes the alicyclic compounds such as cyclohexyl, cyclopentyl, 2-methylcyclopentyl, acenaphthyl or indanyl trichloromethyl disulfides or sulfenates.

A further class of presently useful compounds includes the trichloromethyl disulfides or sulfenates of heterocyclic compounds such as 2-thenyl, 2-mercaptobenzothiazoyl, 3-furyl, 2-pyridyl, 2-(3-thenylpropyl) or 2-furylmethyl trichloromethyl disulfides or sulfenates.

For purposes of economy, of course, there are preferred the more readily available alkyl and aryl trichloromethyl sulfenates or disulfides of from 2 to 19 carbon atoms and halogen substitution products thereof.

Whereas the present invention provides substituted methylene derivatives of phosphoranoate esters, defined above, of pronounced interest in that such compounds possess a very high degree of insecticidal activity, it also provides a convenient route to esters (when a disulfied or sulfenate is employed as one of the reactants), e.g., mixed pentavalent phosphorous esters such as the O,O-dialkyl S-alkyl phosphorothioates of which O,O-di-n-butyl S-methyl phosphorothioate is an example.

Compounds of this invention obtained when a phosphite ester is used as the starting material have the empirical formula $R_7CO_9P_3S$, wherein R represents the organo radicals of the phosphite ester used, and are substituted methylenephosphoranetrioate esters, examples of which are:

Tributyl [(dibutoxyphosphinyl)(dibutoxyphosphinylthio) methylene]phosphoranetrioate, Tris(2-bromoethyl) {[bis(2 - bromoethoxy)phosphinyl-thio][bis(2 - bromoethoxy)phosphinylthio]methylene} phosphoranetrioate,
Diethyl hexyl [(ethoxyhexyloxyphosphinyl)(ethoxyhexyl-oxyphosphinylthio)methylene]phosphoranetrioate,
Triallyl [(diallyloxyphosphinyl)(diallyloxyphosphinyl-thio)methylene]phosphoranetrioate, and
Tris(2-butynyl) {[bis(2-butynyloxy)phosphinyl][bis(2-butynyloxy)phosphinylthio]methylene}phosphorane-trioate.

When phosphonite esters of the type described above are used as the starting material, the respective hydrocarbylphosphoranedioates are formed. Examples of such compounds are:
Diethyl [(ethoxypropylphosphinyl)(ethoxypropylphos-phinylthio)methylene]propylphosphoranedioate,
4-chlorohexyl phenyl [(phenoxyphenylphosphinyl)(phe-noxyphenylphosphinylthio)methylene]phenylphos-phoranedioate,
Bis(2-chloropropyl) {[(2-chloropropoxy)allylphosphinyl] [(2-chloropropoxy)allylphosphinylthio]methylene}al-lylphosphoranedioate,
Diamyl [(amyloxycyclohexylphosphinyl)(amyloxycyclo-hexylphosphinylthio)methylene]cyclohexylphos-phoranedioate,
Diallyl [allyloxyphenylphosphinyl)(allyloxyphenylphos-phenylthio)methylene]phenylphosphoranedioate, and
Bis(2 - butynyl) {[(2-butynyloxy)hexylphosphinyl][(2-butynyloxy)hexylphosphinylthio]methlene}hexlphos-phoranedioate.

Similarly, when phosphinite esters having an aliphatic or halogen-substituted aliphatic radical bonded through an oxygen atom to the phosphorus atom are used in the reaction with one of the chlorine-containing organic sulfur compounds described above, the products obtained are dihydrocarbylphosphoranoates, examples of which are:
Methyl [(dimethylphosphinyl)(dimethylphosphinylthio) methylene]dimethylphosphoranoate,
2-chloroethyl {[bis(3 - hexenyl)phosphinyl][bis(3 - hex-enyl)phosphinylthio]methylene}bis(3 - hexenyl)phos-phoranoate,
Propyl [(diphenylphosphinyl)(diphenylphosphinylthio) methylene]diphenylphosphoranoate,
2 - bromopropyl [(dipropylphosphinyl)(dipropylphos-phinylthio)methylene]dipropylphosphoranoate,
Allyl [(diethylphosphinyl)(diethylphosphinylthio)meth-ene]diethylphosphoranoate, and
Propynyl [(diphenylphosphinyl)(diphenylphosphinyl-thio)methylene]diphenylphosphoranoate.

Reaction of esters of trivalent phosphorus acids with thiophosgene or with trichloromethyl disulfides occurs readily at ordinary, decreased, or increased temperatures. It is surprising that reaction occurs when operating at very low temperatures, e.g., at a temperature of minus 75° C. When trichloromethyl sulfenates are employed, usually some warming, say, at 50° to 125° C., is helpful in initiating the reaction. Although cooling is not necessary, once the reaction has started, it is usually preferred to apply some cooling to minimize the formation of decomposition products that might result from operation at unnecessarily high temperatures. When employing the more active compounds, reaction may be essentially complete at ordinary temperatures or below, but it is usually preferred to apply external heating after the initial exothermic reaction has subsided. The degree of heating will depend upon the nature of the reactants but will generally vary to below the decomposition point of the reaction mixture. Temperatures of up to 175° C. may be useful when employing the less reactive starting material. In some instances, particularly when employing the higher molecular weight disulfides or sulfenates, the use of an inert solvent or diluent is advantageous. Such inert solvents or diluents may be, for example, benzene, hexane, xylene, ether, etc. While the reactants are advantageously employed in stoichiometric proportions, such proportions need not be employed since any unreacted material is readily recovered from the reaction products.

The present phosphoranoate esters are stable, well-defined compounds which range from viscous liquids to waxy or crystalline solids. They may be advantageously employed for a variety of industrial purposes, but are particularly useful as the active ingredient in insecticidal compositions. As herein shown, the present compounds are particularly toxic to mites and leaf-feeding insects when supplied as a spray. They also possess significant systemic action. When using the compounds of the present invention in insecticidal compositions, or in other applications, removal of the by-products of the reaction may be unnecessary. In fact, there may be advantages in retaining the by-products in the major product. For example, when the chlorine-containing organosulfur reactant is a trichloromethyl disulfide or sulfenate, i.e., $CCl_3SXR''$, the $R''$ radical may be selected so as to give a pentavalent phosphorus ester by-product that has synergistic or insecticidal activity of its own, thus resulting in enhancement of the over-all insecticidal activity of the mixture. It will be obvious to those skilled in the art that there are many $R''$ groups that could be employed in this manner.

The products of the present invention are very chemically reactive as a result of the presence of a double bond connected to a carbon atom and to a phosphorus atom of an ester. Consequently these compounds are useful as intermediates for the synthesis of many new organophosphorus compounds not previously available.

Other applications in which the products of the present invention are useful are as oil additives, gasoline additives, antioxidants, stabilizers, and fire-retardant additives for various polymer systems.

The present invention is further illustrated, but not limited, by the following examples:

EXAMPLE 1

To 104 g. (0.50 mole) of triisopropyl phosphite in an ice-cooled flask there was added 23.7 g. (0.12 mole) of methyl trichloromethyl disulfide during 20 minutes at a temperature of 8–12° C. When all of the disulfide had been added the whole was heatd to 92° C. and then allowed to stand overnight. After removing by-product isopropyl chloride by stirring under water pump vacuum and heating to a pot temperature of 121° C., the reaction mixture was distilled to remove by-product O,O-diisopropyl S-methyl phosphorothioate, B.P. 55–65° C./0.1 mm. (largely 55° C.), giving as residue 68.6 g. (98% theoretical yield) of a viscous green-yellow liquid which solidified upon standing A portion of this solid was recrystallized from hexane to give a white solid, M.P. 43.5–45.5° C., which analyzed as follows:

|  | Found | Calcd. for $C_{22}H_{49}O_9P_3S$ |
|---|---|---|
| Percent C | 45.60 | 45.5 |
| Percent H | 8.43 | 8.5 |
| Percent P | 16.06 | 16.0 |
| Percent S | 5.70 | 5.5 |

The above analyses thus correspond to $(C_3H_7)_7CO_9P_3S$.

EXAMPLE 2

This example describes preparation of the product, $(C_3H_7)_7CO_9P_3S$, from triisopropyl phosphite and thiophosgene instead of methyl trichloromethyl disulfide as in the preceding example. The phosphite (114 g.) was placed in an ice-cooled flask, and 31.5 (0.27 mole) of thiophosgene was added thereto during a period of 45 minutes at a temperature of 5–12° C. The exothermic reaction subsided after about two-thirds of the thiophosgene had been added. After standing at room temperature overnight, an additional 57 g. of the phosphite (total 171 g., 0.82 mole) was added to the reaction mixture with cooling at 25–29° C. The exothermic reaction at this time continued almost to the end of the addition. The resulting orange reaction mixture was placed under water pump vacuum and heated to 110° C., whereby 41.5 g. (97% theoretical yield) of isopropyl chloride was recovered as by-product. There was thus obtained 159 g. (100% theoretical yield) of an orange liquid residue which crystallized to a solid mass upon standing overnight. Recrystallization of a portion twice from hexane gave the compound $(C_3H_7)_7CO_9P_3S$, M.P. 44–46° C., analyzing as follows:

|  | Found | Calcd. for $C_{22}H_{49}O_9P_3S$ |
| --- | --- | --- |
| Percent C | 45.51 | 45.5 |
| Percent H | 8.50 | 8.5 |
| Percent P | 16.00 | 16.0 |
| Percent S | 5.62 | 5.5 |

Cryscopic molecular weight determination of the recrystallized product gave a molecular weight of 576 as against 582, the calculated molecular weight for $C_{22}H_{49}O_9P_3S$. These results, along with nuclear magnetic phosphorus resonance spectra and data obtained by hydrolysis and ozonization, are consistent with the structure

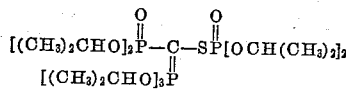

which may be given the name, triisopropyl [(diisopropoxyphosphinyl) (diisopropoxyphosphinylthio)methylene]phosphoranetrioate. There was no appreciable depression of its mixed melting point with the product of the preceding example. Their nuclear magnetic resonance and infrared spectra were identical. Accordingly, it is believed that the same compound is obtained by the process of this example and the by the process of the preceding example.

EXAMPLE 3

A solution of 100 ml. of hexane and 34.5 g. (0.3 mole) of thiophosgene was placed in a 500 cc. flask and cooled in a Dry-Ice bath as 62.5 g. (0.3 mole) of freshly distilled triisopropyl phosphite was added during a period of 20 minutes at a temperature of from minus 60° C. to minus 75° C. There appeared to be an exothermic reaction during the addition and much orange solid was formed. When addition of the phosphite had been completed, the Dry-Ice bath was removed. There appeared to be no indication of further reaction as the mixture was allowed to attain room temperature. At 18° C., however, all of the solid had dissolved. Concentration of the orange solution to 40° C./4 mm. gave a yellow residue which largely solidified upon cooling to room temperature. This was recrystallized from hexane to give a white solid, M.P. 40–44° C., which was substantially pure triisopropyl [(diisopropoxyphosphinyl) (diisopropoxyphosphinylthio)-methylene]phosphoranetrioate.

EXAMPLE 4

Freshly distilled triethyl phosphite (748 g., 4.51 moles) was placed in an ice-cooled flask and 222.5 g. (1.12 moles) of freshly distilled trichloromethyl methyl disulfide was added during 45 minutes at 18–25° C. The resulting orange reaction mixture was then heated to 85° C. and then placed under water pump vacuum for a few minutes to remove by-product ethyl chloride. Upon distillation of the reaction mixture, there was obtained 233 g. of a yellow liquid, B.P. up to 89° C./0.7 mm. (largely 80–82° C./0.4 mm.). There was also obtained 514 g. of a red liquid residue. Analyses of the residue gave the following values:

|  | Found | Calcd. for $C_{15}H_{35}O_9P_3S$ |
| --- | --- | --- |
| Percent C | 37.04 | 37.2 |
| Percent H | 7.14 | 7.3 |
| Percent Cl | 0.02 | 0.0 |
| Percent P | 19.16 | 19.2 |
| Percent S | 6.29 | 6.6 |

It is apparent from the analyses that the residue has the formula $(CH_3CH_2)_7CO_9P_3S$ which corresponds to triethyl [(diethoxyphosphinyl)(diethoxyphosphinylthio)-methylene]phosphoranetrioate,

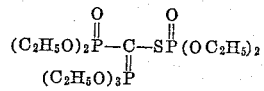

The boiling point of the distillate obtained above as well as its nuclear magnetic resonance spectrum and the following analyses shows it to be O,O-diethyl S-methyl phosphorothioate.

|  | Found | Calcd. for $C_5H_{13}O_3PS$ |
| --- | --- | --- |
| Percent C | 32.66 | 32.6 |
| Percent H | 7.31 | 7.1 |
| Percent P | 16.97 | 16.8 |
| Percent S | 17.69 | 17.4 |

EXAMPLE 5

Ethyl trichloromethanesulfenate (28.3 g., 0.145 mole) was charged to a reactor fitted with a glass stirrer, thermometer, dropping funnel, and condenser equipped with a trap, and 108 g. (0.65 mole) of freshly distilled triethyl phosphite was gradually added during a time of 40 minutes. The reaction mixture was heated to about 95° C. early in the addition. At this point an exothermic reaction was noted and this temperature was maintained in the reaction mixture without external heating until about half of the triethyl phosphite had been added. External heating was required during the remainder of the addition in order to maintain the temperature at about 100° C. The resulting light yellow reaction mixture was then heated at a temperature of 155–162° C. for 1 hour. During the reaction a total of 24.1 g. of by-product ethyl chloride was collected. Distillation of the reaction mixture gave a fraction, B.P. up to 55° C./0.7 mm., and as residue 65.5 g. of the substantially pure triethyl [(diethoxyphosphinyl) (diethoxyphosphinylthio)methylene] - phosphoranetrioate which analyzed as follows:

| Percent C | 37.47 | 37.2 |
| --- | --- | --- |
| Percent H | 7.52 | 7.28 |
| Percent P | 18.33 | 19.2 |
| Percent S | 5.79 | 6.6 |

Fractionation of the distillate gave 25.9 g. (98% yield) of triethyl phosphate, B.P. 53–54.5°C./0.9 mm.

EXAMPE 6

Thiophosgene, 34.5 g. (0.3 mole) was added to 99.6 g. (0.6 mole) of triethyl phosphite during 45 minutes at a temperature of 0 to 10° C. For about the first two-thirds of the time during which the thiophosgene was being added, an exothermic reaction occurred. The reaction mixture was stirred while warming to room temperature. Additional triethyl phosphite (50 g.) was then added to the reaction mixture with cooling at 27–29° C.; a total of 0.9 mole of triethyl phosphite was needed to consume the 0.3 mole of thiophosgene that was used. During addition of the last portion of phosphite, the color of the reaction mixture changed from red to yellow. The mixture was heated to 62° C. and then concentrated to a pot temperature of 131° C./1.5 mm. to give 137.2 g. (94.5% of theoretical yield) of an orange liquid, $n_D^{25}$ 1.4726, which was triethyl [(diethoxyphosphinyl)(diethoxyphosphinylthio)methylene]phosphoranetrioate. It analyzed as follows:

|  | Found | Calcd. for $C_{15}H_{35}O_9P_3S$ |
|---|---|---|
| Percent C | 36.68 | 37.2 |
| Percent H | 7.23 | 7.3 |
| Percent S | 6.76 | 6.6 |

EXAMPLE 7

This example shows the reaction of thiophosgene with triethyl phosphite employing benzene as a reaction diluent. Benzene (110 ml.) and 57.5 g. (0.5 mole) of thiophosgene were placed in a 500 ml. flask and the mixture was cooled in an ice-salt bath. To this there was then added 83 g. (0.5 mole) of triethyl phosphite during one hour at a temperature of minus 4° to 3° C. The resulting orange reaction mixture was allowed to attain room temperature and then concentrated to a pot temperature of 112° C./1 mm. to remove benzene, ethyl chloride, and unreacted thiophosgene. There was thus obtained as residue 80.7 g. (100% theoretical yield) of the substantially pure triethyl [(diethoxyphosphinyl)(diethoxyphosphinylthio)methylene]phosphoranetrioate which analyzed as follows:

|  | Found | Calcd. for $C_{15}H_{35}O_9P_3S$ |
|---|---|---|
| Percent C | 36.88 | 37.2 |
| Percent H | 7.13 | 7.3 |
| Percent Cl | 0.47 | 0.0 |
| Percent S | 6.60 | 6.6 |

EXAMPLE 8

To 28 g. (0.095 mole) of 4-chlorophenyl trichloromethyl disulfide there was added, dropwise with cooling, during 45 minutes, 63.2 g. (0.38 mole) of freshly distilled triethyl phosphite. The reaction mixture was then heated to 150° C. within 1 hour and 15 minutes and then maintained at a temperature of 150–155° C. for 30 minutes. Up to this point a total of 14.8 g. of ethyl chloride was collected in a trap leading from the reaction vessel. Concentration of the resulting reaction mixture to 150 C./1 mm. gave as residue 66.5 g. of an orange liquid, $n_D^{25}$ 1.4971, which was substantially an equimolar mixture of triethyl [(diethoxyphosphinyl)(diethoxyphosphinylthio)(methylene]phosphoranetrioate and O,O-diethyl S-(4-chlorophenyl)phosphorothioate which analyzed as follows:

|  | Found | Calcd. for Equimolar Mixt. of $C_{10}H_{14}ClO_3PS$ and $C_{15}H_{35}O_9P_3S$ |
|---|---|---|
| Percent C | 39.32 | 39.2 |
| Percent H | 6.5 | 6.47 |
| Percent Cl | 5.07 | 4.63 |
| Percent P | 15.11 | 16.2 |
| Percent S | 8.65 | 8.4 |

EXAMPLE 9

Trimethyl phosphite, 149 g. (1.2 moles), was added during 45 minutes at a temperature of 12–28° C. to 67.6 g. (0.3 mole) of n-propyl trichloromethyl disulfide. External cooling was employed since the reaction was exothermic during almost all of the addition. When all of the phosphite had been added, the reaction mixture was heated to 82° C. and then evacuated under water pump pressure at 40–50° C. for about 30 minutes to remove the by-product methyl chloride. Distillation of the reaction mixture gave 46.7 g. of a yellow distillate, B.P. 70–75° C./0.2–0.3 mm., and 114.4 g. (99% theoretical yield) of orange viscous residue, $n_D^{25}$ 1.4911, which was trimethyl [(dimethoxyphosphinyl)(dimethoxyphosphinylthio)methylene]phosphoranetrioate. It analyzed as follows:

|  | Found | Calcd. for $C_8H_{21}O_9P_3S$ |
|---|---|---|
| Percent C | 25.84 | 24.9 |
| Percent H | 5.67 | 5.48 |
| Percent S | 8.78 | 8.3 |

The yellow distillate analyzed for O,O-dimethyl S-n-propyl phosphorothioate as follows:

|  | Found | Calcd. for $C_5H_{13}O_3PS$ |
|---|---|---|
| Percent C | 32.96 | 32.6 |
| Percent H | 7.13 | 7.12 |
| Percent P | 16.06 | 16.8 |

EXAMPLE 10

This example describes a large scale reaction of methyl trichloromethyl disulfide with trimethyl phosphite. To 40 lbs. of trimethyl phosphite in a vessel cooled to 15° C. by means of an ice-bath, a thin stream of methyl trichloromethyl disulfide was introduced during a 4-hour period at a temperature of 20–40° C. The resulting reaction mixture was then heated to 75° C., and the remaining by-product methyl chloride was removed by heating to 85° C./5 mm. The reaction mixture thus obtained consisted of about 29% O,O-dimethyl S-methyl phosphorothioate and about 71% of trimethyl [(dimethoxyphosphinyl)(dimethoxyphosphinylthio)methylene] phosphoranetrioate. The insecticidal activity of this mixture is shown in Example 16.

EXAMPLE 11

Trimethyl phosphite (86.8 g., 0.7 mole) was charged to a flask fitted with a glass stirrer, thermometer, dropping funnel and condenser and cooled in ice. To the cooled phosphite there was added during 45 minutes 34.5 g. (0.3 mole) of thiophosgene. A very exothermic reaction occurred until about three-fourths of the thiophosgene had been added. The reaction mixture was stirred at room temperature for 30 minutes and allowed to stand overnight. Concentration to a pot temperature of 105° C./3 mm. gave 86.1 g. (96% theoretical yield) of a red liquid, $n_D^{25}$ 1.4966, which was substantially pure trimethyl [(dimethoxyphosphinyl)(dimethoxyphosphinylthio)methylene]phosphoranetrioate. It analyzed as follows:

|  | Found | Calcd for $C_8H_{21}O_9P_3S$ |
|---|---|---|
| Percent S | 8.79 | 8.3 |
| Percent P | 23.38 | 24.1 |
| Percent Cl | 0.95 | 0.0 |

EXAMPLE 12

Thiophosgene, 9.5 g. (0.082 mole), was added during 0.3 hour to 49.0 g. (0.24 mole) of diethyl phenylphosphonite cooled at 8–12° C. The reaction mixture was warmed to 60° C. and then concentrated to 135° C./0.02 mm. to give 46.4 g. (97% of theory) of a viscous yellow residue which was diethyl [(ethoxyphenylphosphinyl)-(ethoxyphenylphosphinylthio)methylene] phenylphosphoranedioate,

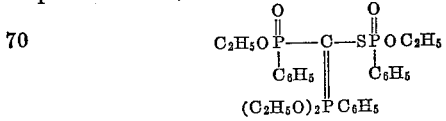

Its nuclear magnetic phosphorus resonance spectrum was consistent with the above structure.

EXAMPLE 13

To 20 g. (0.093 mole) of methyl diphenylphosphinite in 100 ml. of ethyl ether, cooled to −30° C. there was added 3.6 g. (0.031 mole) of thiophosgene during 0.1 hour while controlling the temperature of the mixture at −25° C. to −30° C. Concentration at reduced pressure gave 20 g. of red viscous product which was substantially pure methyl [(diphenylphosphinyl)(diphenylphosphinylthio)methylene]diphenylphosphoraneoate,

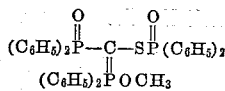

EXAMPLE 14

An 85.0 g. (0.273 mole) portion of tris(2-chloropropyl) phosphite was placed in a flask and cooled in ice as 10.5 g. (0.091 mole) of thiophosgene was added in 0.3 hour at 22° to 35° C. The reaction mixture was warmed to 80° C. and then concentrated to 90° C./0.5 mm. to give 74.9 g. (99% of theory) of a yellow liquid residue which was substantially pure tris(2-chloropropyl){[bis(2-chloropropoxy)phosphinyl][bis(2-chloropropoxy)phosphinylthio]methylene}phosphoranetrioate.

EXAMPLE 15

This example describes insecticidal testing of samples of the compound, triethyl [(diethoxyphosphinyl)(diethoxyphosphinylthio)methylene]phosphoranetrioate,

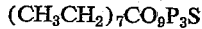

prepared from triethyl phosphite and either methyl trichloromethyl disulfide as in Example 4, ethyl trichloromethanesulfenate as in Example 5, or thiophosgene as in Example 6.

Residue contact tests were conducted as follows:

The respective test samples were dissolved in acetone to make 70.0 ml. of a 1% solution; and this was further diluted to make 50 ml. of 0.1% solution. Petri dishes were respectively sprayed in a Hoskins horizontal spray chamber by means of a modified Potter sprayer with the respective solution for 15 seconds at a pressure of 20 p.s.i. Two dishes were sprayed with each solution to provide duplicates. An additional period of 30 seconds was allowed for settling of the mist. Approximately 20 ml. of solution was used for each spraying and the open dishes were held for 24 hours. Then 10 *Tribolium confusium* adults were placed in one set of the duplicate dishes and 10 fourth instar large milkweed nymphs (*Oncopeltus fasciatus*) were placed in the other set of duplicate dishes. The dishes were then held uncovered at room temperature for 48 hours. The following results were obtained:

| Chem. Tested | Percent Kill | |
|---|---|---|
| | Tribolium | Milkweed bug |
| Example 4: | | |
| at 1% | 100 | 100 |
| at 0.1% | 100 | 100 |
| Example 5: | | |
| at 1% | 100 | 100 |
| at 0.1% | 100 | 100 |
| Example 6: | | |
| at 1% | 100 | 100 |
| at 0.1% | 100 | 100 |

Testing of the samples as plant spray insecticides was conducted as follows: Respective emulsions of the samples were prepared by adding a cyclohexanone solution of the test compound and an emulsifying agent to water to give respective emulsions containing concentrations of 0.4% and 0.2% of test chemicals. In each case the emulsifier, employed in a quantity of 0.2% by weight based on the weight of the total emulsion, was a mixture of a higher alkylbenzenesulfonate and a polyalkylene glycol known to the trade as "Emulsifier L." Potted bean plants were respectively sprayed to run-off with the emulsions. Twenty four hours after spraying 5 bean beetle larvae were transferred to the foliage of each of the sprayed plants. The plants were then held 3 days for observation. At the end of that time inspection of the sprayed and infested plants showed a 100% kill of the bean beetle larvae on all of the test plants, i.e., on plants which had been sprayed with either the 0.4% or the 0.2% emulsions of the compound of either Example 4, Example 5, or Example 6.

In still another insecticide test, bean plants which had been infested with the 2-spotted spider mite were sprayed with similarly prepared 0.2% and 0.1% respective emulsions of the three different samples. The sprayed plants were held 7 days for observation of kill of mobile and resting forms, eggs, and residual effect on the population. At the end of that period plants which had been sprayed with the 0.2% and the 0.1% emulsions of the compound of either Example 4, 5 or 6 showed in all cases a 100% kill of both the adults and the eggs and a 100% residual toxicity.

The systemic insecticidal effect of the three different samples was tested as follows: Black valentine bean plants in the second leaf stage were cut and held for 3 days in duplicate respective aqueous solutions of 10 and 100 p.p.m. of samples of either Example 4, 5 or 6. The plants were then transferred to water and 5 bean beetle larvae were transferred to each of 1 set of the duplicate test plants and 30 to 50 mites to the other of the duplicate test plants. Observation at the end of 3 days showed a 100% kill of the beetles and mites at both the 10 and 100 p.p.m. concentrations of either of the 3 test samples.

In still another insecticidal test cabbage plants infested with the cabbage aphid were respectively sprayed to run-off with 0.4% and 0.2% emulsions of samples of the compound of either Example 4, 5 or 6. Observation at the end of the sprayed plants showed a 100% kill of the aphids at both the 0.4% and the 0.2% concentrations of each of the 3 test samples.

EXAMPLE 16

The compound trimethyl [(dimethoxyphosphinyl)(dimethoxyphosphinylthio)methylene]phosphoranetrioate, $(CH_3)_7CO_9P_3S$, of Example 10 was tested for insecticidal activity substantially as in Example 15, except that decreasing concentrations were employed in order to find the lowest concentration at which activity was displayed.

Emulsions were prepared by placing 0.1 cc. of the test chemical into a 200 flask, adding 5–10 cc. of acetone and 3 drops of a sorbitan mono-laurate polyalkylene glycol ether as emulsifier. They were thoroughly mixed, and 100 cc. of tap water was added to make an 0.1% emulsion of the test compound.

In one test the 0.1% emulsion was diluted with water to give an 0.025% concentration of the test compound. Leaves of Wood's Prolific lima beans were dipped into the diluted emulsion and dried. Each of the dried leaves were then infested with 10 third instar Southern armyworm larvae and stored in the insectary for 48 hours at 77° C. At the end of that time 90% kill of the larvae was observed.

In another test the 0.1% emulsion was diluted to give an 0.013% concentration of the test compound. Bean plants infested with bean beetles were sprayed with the diluted solution and set aside to dry. A 90% kill of the bean beetles was observed.

Systemic activity was effected by diluting the 0.1% emulsion to give an 0.002% concentration of the test compound, maintaining stems of bean plants in the diluted solutions for 72 hours, and then infesting leaves of the plants with two-spotted spider mites. Observation at the end of 48 hours showed a 97% kill of the mites.

EXAMPLE 17

The mixture of triethyl [(diethoxyphosphinyl)(diethoxyphosphinylthio)methylene]phosphoranetrioate and O,O-diethyl S-(4-chlorophenyl) phosphorothioate obtained in Example 8 was tested for insecticidal activity employing the test methods described in Example 15. In the Petri dish tests a 100% kill of both the *Tribolium confusium* and the milkweed bugs was obtained at either the 1.0% or the 0.1% concentration. In the test which involved infestation of previously sprayed plants a 100% kill of bean beetle larvae was observed at the 0.4% concentration of said mixture. In the test wherein plants which had been infested with mites were sprayed with either an 0.2% or 0.1% emulsion of the mixture, a 100% kill of both the adults and the eggs and a 100% residual toxicity were observed at both these test concentrations of said mixture.

Reasonable variation and modification of the invention as described are possible, the essence of which is that there have been provided (1) new sulfur-containing organic compounds of phosphorus, (2) methods for making these new sulfur-containing organic compounds of phosphorus, (3) insecticidal composition comprising as an essential active ingredient the new sulfur-containing organic compounds of phosphorus of this invention and (4) a method for killing insects by exposing said insects to a toxic quantity of the compounds of this invention.

This application is a continuation-in-part of my application Serial No. 428,821, filed May 10, 1954, my application, Serial No. 581,390, filed April 30, 1956, and of my application, Serial No. 691,801, filed October 23, 1957, all now abandoned.

What I claim is:
1. A compound of the formula

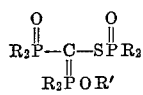

wherein each R is selected from the group consisting of hydrocarbyl, hydrocarbyloxy, and halohydrocarbyloxy radicals having from 1 to 6 carbon atoms, and R' is selected from the group consisting of aliphatic hydrocarbyl and halogen-substituted aliphatic hydrocarbyl radicals having from 1 to 6 carbon atoms.

2. A compound of the formula

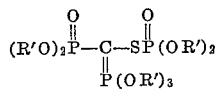

wherein R' is selected from the group consisting of alkyl and haloalkyl radicals having from 1 to 6 carbon atoms.

3. A compound of the formula

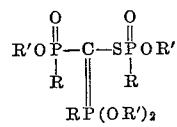

wherein each R is a hydrocarbyl radical having from 1 to 6 carbon atoms, and R' is selected from the group consisting of aliphatic hydrocarbyl and halogen-substituted aliphatic hydrocarbyl radicals having from 1 to 6 carbon atoms.

4. A compound of the formula

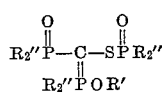

wherein each R'' is a hydrocarbyl radical having from 1 to 6 carbon atoms, and R' is selected from the group consisting of aliphatic and halogen-substituted aliphatic radicals having from 1 to 6 carbon atoms.

5. Triethyl [(diethoxyphosphinyl)(diethoxyphosphinylthio)methylene]phosphoranetrioate of the structure

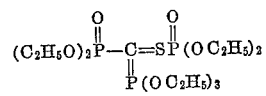

6. Trimethyl [(dimethoxyphosphinyl)(dimethoxyphosphinylthio)methylene]phosphoranetrioate of the structure

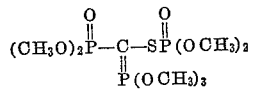

7. Diethyl [(ethoxyphenylphosphinyl)(ethoxyphenylphosphinylthio)methylene]phenylphosphoranedioate of the structure

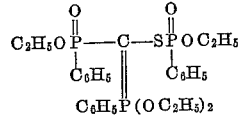

8. Methyl [(diphenylphosphinyl)(diphenylphosphinylthio)methylene]diphenylphosphoranoate of the structure

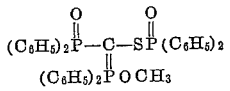

9. Tris(2-chloropropyl) {[bis(2-chloropropoxy)phosphinyl] [bis(2 - chloropropoxy)phosphinylthio] methylene}phosphoranetrioate of the structure

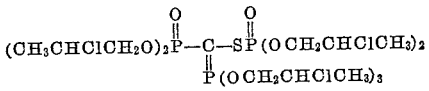

10. The method which comprises reacting an ester of a trivalent phosphorus acid of the formula

wherein each R is selected from the group consisting of hydrocarbyl, hydrocarbyloxy and halohydrocarbyloxy radicals having from 1 to 6 carbon atoms, and R' is selected from the group consisting of aliphatic hydrocarbyl and halogen-substituted aliphatic hydrocarbyl radicals having from 1 to 6 carbon atoms with a chlorine-containing organic sulfur compound selected from the group consisting of thiophosgene and a trichloromethyl sulfur compound of the formula $$CCl_3SXR'''$$

in which X is a chalcogen having an atomic weight of from 15 to 33 and R''' is an organic radical having a molecular weight of up to 300 and is joined to the X atom through a carbon atom thereof, and recovering from the resulting reaction mixture a compound having the formula

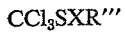

wherein R, and R' are as defined above.

11. The method which comprises reacting a trialkyl phosphite having from 1 to 6 carbon atoms in each alkyl radical with a member of the group consisting of thiophosgene and a trichloromethyl sulfur compound of the formula $$CCl_3SXR'''$$

in which X is a chalcogen having an atomic weight of from 15 to 33 and R''' is an organic radical having a molecular weight of up to 300 and is joined to the X atom through a carbon atom of the R''' radical, and recovering from the resulting reaction mixture a compound having the formula

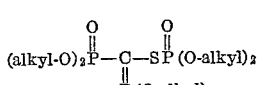

wherein each of the alkyl groups has from 1 to 6 carbon atoms.

12. The method which comprisese reacting trimethyl phosphite with an alkyl trichloromethyl disulfide having 1 to 18 carbon atoms in the alkyl group and recovering from the resulting reaction mixture trimethyl [(dimethoxyphosphinyl) (dimethoxyphosphinylthio)methylene]phosphoranetrioate of the structure

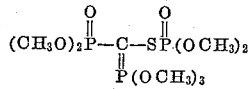

13. The method which comprises reacting triethyl phosphite with an alkyl trichloromethyl sulfenate having from 1 to 18 carbon atoms in the alkyl radical and recovering from the resulting reaction mixture triethyl [(diethoxyphosphinyl) (diethoxyphosphinylthio)methylene]phosphoranetrioate of the structure

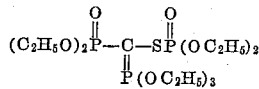

14. The method which comprises reacting diethyl phenylphosphonite with thiophosgene and recovering from the resulting reaction mixture diethyl [(ethoxyphenylphosphinyl) (ethoxyphenylphosphinylthio)methylene]phenylphosphoranedioate of the structure

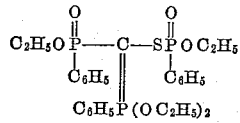

15. The method which comprises reacting methyl diphenylphosphinite with thiophosgene and recovering from the resulting reaction mixture methyl [(diphenylphosphinyl) (diphenylphosphinylthio)methylene]diphenylphosphoranoate of the structure

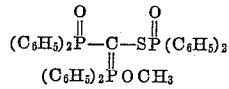

16. An insecticidal composition comprising as an essential effective ingredient the compound defined in claim 1.

17. An insecticidal composition comprising as an essential effective ingredient the compound defined in claim 5.

18. An insecticidal composition comprising as an essential effective ingredient the compound defined in claim 6.

19. A method of protecting plants against insect attack which comprises applying to the plants an insecticidal quantity of a compound of the formula

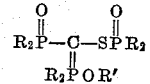

wherein R is selected from the group consisting of hydrocarbyl, hydrocarbyloxy, and halohydrocarbyloxy radicals having from 1 to 6 carbon atoms, and R' is selected from the group consisting of alkyl and haloalkyl radicals having from 1 to 6 carbon atoms.

20. An insecticide composition comprising as an essential active ingredient therein a mixture of a compound having the formula

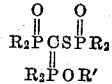

wherein each R is selected from the group consisting of hydrocarbyl, hydrocarbyloxy and halohydrocarbyloxy radicals having from 1 to 6 carbon atoms, and R' is selected from the group consisting of aliphatic hydrocarbyl and halogen-substituted aliphatic hydrocarbyl radicals having from 1 to 6 carbon atoms, and a pentavalent phosphorus ester of the formula

wherein R is as defined above and R" is an organic radical having a molecular weight of up to 300 and is joined to the X atom through a carbon atom thereof, and X is a chalcogen having an atomic weight of from 15 to 33.

References Cited in the file of this patent

Wilms: German Patentanmeldung, F10104 IV b/120, Apr. 5, 1956.